(12) United States Patent
Jackson et al.

(10) Patent No.: US 10,975,256 B2
(45) Date of Patent: *Apr. 13, 2021

(54) INK COMPOSITIONS

(71) Applicant: Hewlett-Packard Development Company, L.P., Spring, TX (US)

(72) Inventors: Milton Neill Jackson, Corvallis, OR (US); Jayprakash C. Bhatt, Corvallis, OR (US); Larrie A. Deardurff, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/499,373

(22) PCT Filed: Sep. 14, 2017

(86) PCT No.: PCT/US2017/051488
§ 371 (c)(1),
(2) Date: Sep. 30, 2019

(87) PCT Pub. No.: WO2019/055010
PCT Pub. Date: Mar. 21, 2019

(65) Prior Publication Data
US 2020/0056059 A1   Feb. 20, 2020

(51) Int. Cl.
*C09D 11/322* (2014.01)
*B41M 5/00* (2006.01)
(Continued)

(52) U.S. Cl.
CPC .......... *C09D 11/322* (2013.01); *B41J 2/2107* (2013.01); *B41M 5/0023* (2013.01);
(Continued)

(58) Field of Classification Search
CPC .......... C09D 11/36; C09D 11/40; C09D 11/30; C09D 11/38; C09D 11/32; C09D 11/322;
(Continued)

(56) References Cited

U.S. PATENT DOCUMENTS 5,456,743 A   10/1995   Fry
5,853,465 A   12/1998   Tsang et al.
(Continued)

FOREIGN PATENT DOCUMENTS

EP   0943666   9/1999
EP   2083055   7/2009
(Continued)

OTHER PUBLICATIONS

Cherrington, Inkjet-Printed TiO2 Nanoparticles from Aqueous Solutions for Dye-Sensitized Solar Cells (DSSCs), Energy Technology, vol. 3, issue 8, 2015, 3 pages.
(Continued)

*Primary Examiner* — Manish S Shah
(74) *Attorney, Agent, or Firm* — Thorpe North & Western LLP

(57) ABSTRACT

The present disclosure is drawn to ink compositions including an aqueous liquid vehicle, from 1 wt % to 9 wt % pigment dispersed in the aqueous liquid vehicle by an ionic polymeric dispersant associated with pigment, from 0.5 wt % to 5 wt % non-ionic polymeric binder having a weight average molecular weight from 400 Mw to 20,000 Mw, and from 0.1 wt % to 1.5 wt % monovalent salt.

18 Claims, 3 Drawing Sheets

(51) Int. Cl.
*C09D 11/033* (2014.01)
*C09D 11/037* (2014.01)
*C09D 11/102* (2014.01)
*C09D 11/38* (2014.01)
*B41J 2/21* (2006.01)

(52) U.S. Cl.
CPC .......... *C09D 11/033* (2013.01); *C09D 11/037* (2013.01); *C09D 11/102* (2013.01); *C09D 11/38* (2013.01)

(58) Field of Classification Search
CPC ... C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 3/4078; B41J 2/04588; B41J 2/04595; B41J 2/04586; B41J 2/14274; B41J 2/01; B41J 2/211; B41J 2/1433; B41J 2/17; B41J 2/17593; B41J 2/2107; B41J 2/1755; B41J 2/2114; B41J 2/2056; B41J 2/21; B41J 2/0057; B41J 3/60; B41J 2002/012; B41J 2/04598; B41J 2/1623; B41J 2202/00; B41J 2202/03; B41J 2/2117; B41J 2/045; B41J 11/0015; B41J 11/002; B41J 2/04581; B41J 2/055; B41J 2/16538; B41J 2/14201; B41J 2002/16502; B41J 25/001; B41J 25/312; B41J 2025/008; B41J 2202/21; B41J 25/34; B41J 25/003; B41J 2/17596; B41J 2/16508; B41J 2/1652; B41J 2/175; B41J 2/17563; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 7,160,376 | B2 | 1/2007 | Watanabe et al. |
| 8,946,320 | B2 | 2/2015 | Guo et al. |
| 2009/0169748 | A1 | 7/2009 | House et al. |
| 2012/0329921 | A1* | 12/2012 | Vasudevan .......... C09D 11/324 524/104 |
| 2013/0286087 | A1 | 10/2013 | Berge |
| 2015/0218397 | A1 | 8/2015 | Li et al. |

FOREIGN PATENT DOCUMENTS

| | | |
|---|---|---|
| EP | 3124559 | 2/2017 |
| WO | 2011115614 | 9/2011 |
| WO | 2015177182 | 11/2015 |

OTHER PUBLICATIONS

Lamminmaki et al., Absorption Capability and Inkjet Ink Colorant Penetration into Binders Commonly Used in Pigmented Paper Coatings, Industrial & Engineering Chemistry Research, 2011, 2 pages.
Mielonen, The Effect of Cationic-Anionic Polyelectrolyte Multilayer Surface Treatment on Inkjet Ink Spreading and Print Quality, Thesis, Lappeenranta University of Technology, 2015, 83 pages.
International Search Report dated Apr. 19, 2018 for PCT/US2017/051488, Applicant Hewlett-Packard Development Company, L.P.

* cited by examiner

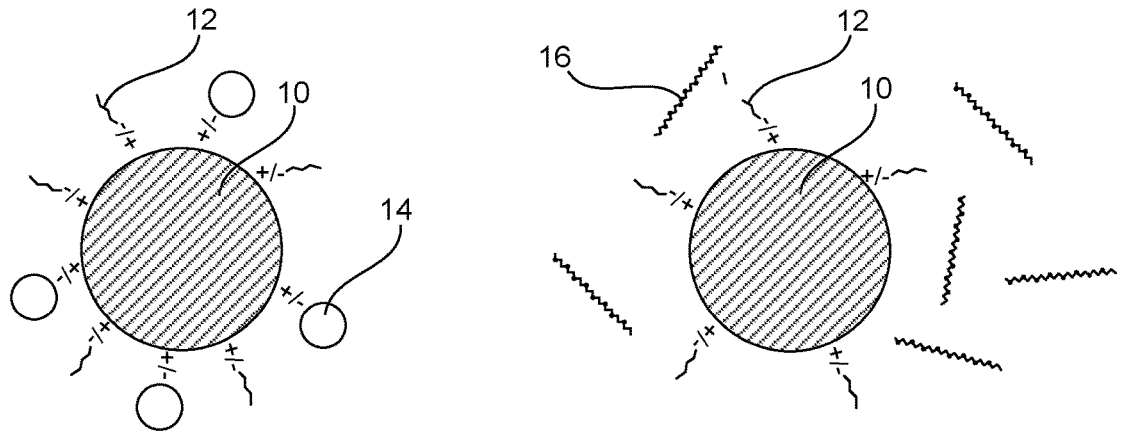

Ionic Polymeric Binder Particles Correlates with More Pigment Surface Interaction Non-ionic Polymeric Binder Correlates with Less Pigment Surface Interaction

310 — inkjetting an ink composition from a fluid container through an inkjet printing orifice onto a porous media substrate, wherein the ink composition comprises an aqueous liquid vehicle, from 1 wt% to 9 wt% pigment dispersed in the aqueous liquid vehicle by an ionic polymeric dispersant associated with pigment, from 0.5 wt% to 5 wt% non-ionic polymeric binder having a weight average molecular weight from 400 Mw to 20,000 Mw, and from 0.1 wt% to 1.5 wt% monovalent salt

FIG. 3

INK COMPOSITIONS

BACKGROUND

Color pigments are typically dispersed or suspended in a liquid vehicle to be utilized in inks. A variety of colored pigments are difficult to disperse and stabilize in water-based vehicles due to the nature of the surface of pigments and the self-assembling behavior of pigments. One way to facilitate color pigment dispersion and sustained suspension in a liquid vehicle is to add a dispersant, such as an ionic polymeric dispersant, to the liquid vehicle. The ionic polymeric dispersant stabilizes the dispersion and/or suspension of the pigments. Often, aqueous pigments based inks that are stabilized using polymer can penetrate print media resulting in low color saturation. Thus, enhancing color saturation of polymer dispersed pigments would be a desirable property to achieve generally.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology. It should be understood that the figures are representative examples of the present technology and should not be considered as limiting the scope of the technology.

FIG. 2 compares example surface interactions between ionic polymer dispersed pigment with ionic polymeric binder particles or non-ionic polymeric binder.

FIG. 3 depicts a flow chart of an example method of printing in accordance with the present disclosure.

DETAILED DESCRIPTION

Figure 1:
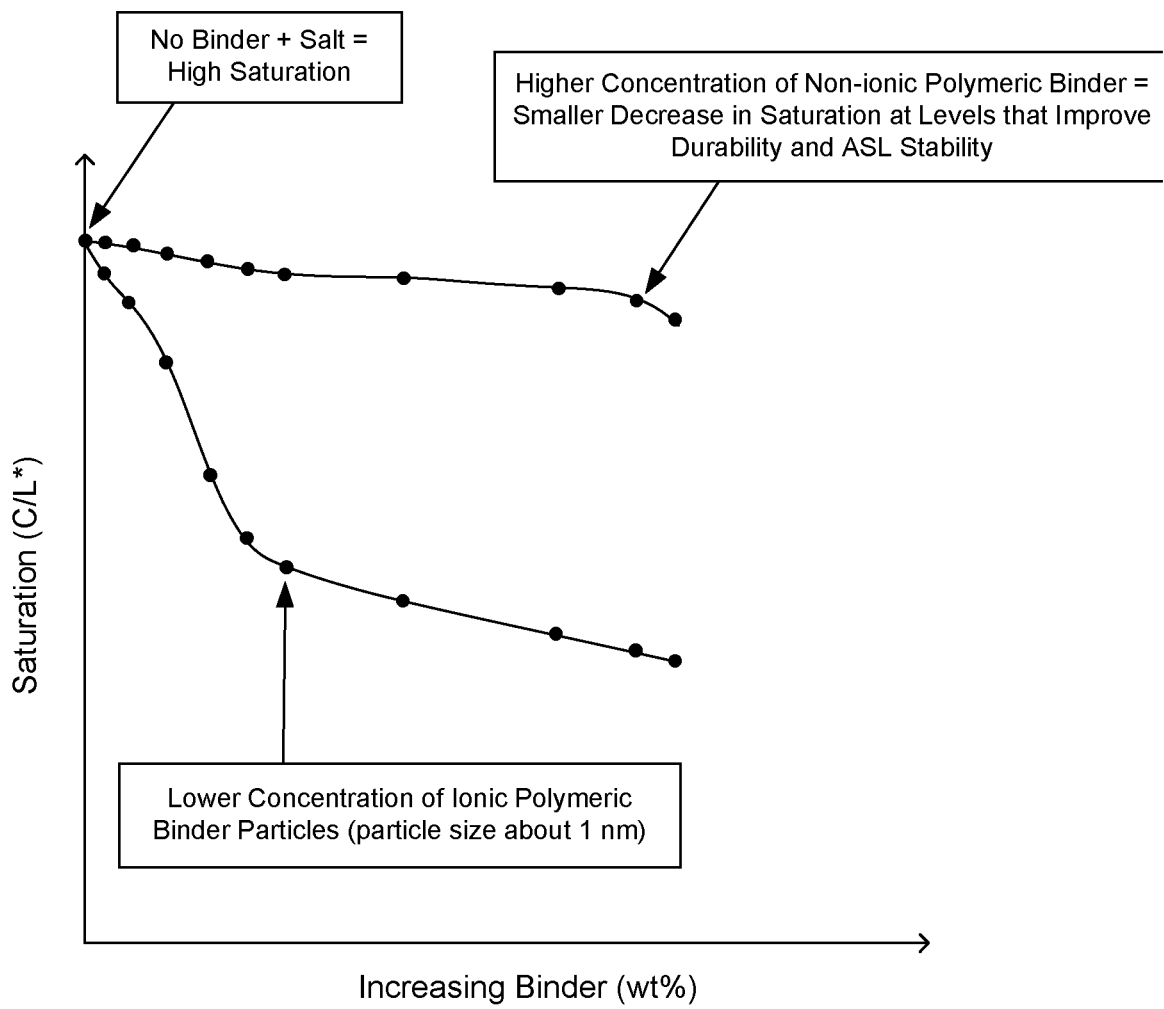
FIG. 1 graphically depicts example saturation trends in ink compositions containing pigment and monovalent salt, comparing the use of non-ionic polymeric binder vs. ionic polymeric binder particles.

Pigmented inks can exhibit low color saturation on office media, such as plain paper or other non-specialized media. Certain media preparations have been used to combat this, such as ColorLok® media from HP, Inc., where the media interacts with the ink and pigment to keep the pigment at or near the surface of the media. Without these types of media preparations, pigment in inks tends to penetrate into the media. When the pigment penetrates deeper into the media surface, there remains less pigment on the media surface, which results in low color saturation. In order to increase color saturation on non-specialized media, such as non-ColorLok® office media, inks can be prepared to exhibit a charge stabilization within a relatively narrow window. For example, when charge stabilization is reduced, there can be a significant increase in color saturation on more traditional types of media, e.g., plain paper and the like. However, when charge stabilization is reduced too much, the pigments in the inks tend to crash, making them unusable in inkjet printing applications.

In further detail, various types of polymers with different functions can be added to inks in accordance with the present disclosure. For example, dispersant polymers can be used to maintain pigment particles in a highly stable, dispersed state within inks using electrostatic and steric forces. Binder polymers, on the other hand, can also be used to help a pigment adhere to the surface of print media and provide durability to the printed image formed therefrom. However, the polymers added, e.g., dispersant polymers and/or binder polymers that are typically added are highly charged, e.g., ionic. Thus, by adding both charged dispersant polymer and charged binder polymer, a high degree of charge can result in the binder polymer behaving to further disperse/stabilize the pigment in the ink. This further stabilization can result in lower color saturation.

Thus, the present disclosure is drawn to inks that introduce some pigment instability to inks by the addition of small concentrations of monovalent salts in order to provide improved color saturation, and at the same time, introduce binder polymers that do not counteract the destabilizing effect introduced to the inks by virtue of the presence of the monovalent salts. In other words, it has been found that by combining added monovalent salts at concentrations that destabilize the pigment in the ink, but not so such that the pigment crashes in the ink, along with non-ionic polymeric binder, ink images can be prepared with improved saturation and durability (compared to similar inks prepared using ionic polymeric binder and monovalent salt, or to similar inks without added monovalent salt).

In one example of the present disclosure, an ink composition can include an aqueous liquid vehicle, from 1 wt % to 9 wt % pigment dispersed in the aqueous liquid vehicle by an ionic polymeric dispersant associated with pigment, from 0.5 wt % to 5 wt % non-ionic polymeric binder having a weight average molecular weight from 400 Mw to 20,000 Mw, and from 0.1 wt % to 1.5 wt % monovalent salt. In further detail, in one example, the non-ionic polymeric binder can be water soluble or miscible with water. Alternatively, the non-ionic polymeric binder can have a weight average molecular weight from 1,000 Mw to 12,000 Mw, 4,000 Mw to 10,000 Mw, or from 6,000 Mw to 8,500 Mw, for example. A suitable non-ionic polymeric binders can include a polysorbate, a poloxamer, a polyglycol, a polyalcohol, an ethoxylated polyalcohol, a polyamine, a polyamide, a polyimine, a polyacrylamide, a polyvinylpyrrolidone, a polysaccharide, or a mixture thereof. In one example, the non-ionic polymeric binder can be a polyethylene glycol. The pigment to monovalent salt weight ratio in the ink composition can be from 5:1 to 25:1, in one example. In another example, the pigment can be present at from 2 wt % to 8 wt %, the non-ionic polymeric binder can be present at from 0.5 wt % to 3 wt %, and the monovalent salt concentration can be from 0.1 wt % to 0.8 wt %. In another example, the pigment can have a crash point when the monovalent salt is present in the ink composition at from 0.06 M to 0.3 M, and the monovalent salt can be present at from 30% to 95% molar concentration of the crash point.

In another example, a method of printing can include inkjetting an ink composition from a fluid container through an inkjet printing orifice onto a surface of a porous media substrate. The ink composition can include an aqueous liquid vehicle, from 1 wt % to 9 wt % pigment dispersed in the aqueous liquid vehicle by an ionic polymeric dispersant associated with pigment, from 0.5 wt % to 5 wt % non-ionic polymeric binder having a weight average molecular weight from 400 Mw to 20,000 Mw, and from 0.1 wt % to 1.5 wt % monovalent salt. In one example, the porous media substrate can be an uncoated cellulose-based fibrous paper having a calcium chloride content of less than 2,500 μg/g of paper. In another example, the method can also include crashing the pigment and/or binding the pigment to the surface of the porous media substrate. In further detail, the pigment can be stable while in the fluid container, and when the ink composition is printed on the porous media substrate, the aqueous liquid vehicle can become absorbed in the porous media substrate, thus increasing ionic strength of the monovalent salt around the pigment. This can cause the pigment to crash at the surface of the porous media substrate without contact with a separate crashing agent. In one example, the non-ionic polymeric binder can be water soluble or miscible with water. In another example, the non-ionic polymeric binder can have a weight average molecular weight from 1,000 Mw to 12,000 Mw. In another example, the non-ionic polymeric binder can be a polysorbate, a poloxamer, a polyglycol, a polyalcohol, an ethoxylated polyalcohol, a polyamine, a polyamide, a polyimine, a polyacrylamide, a polyvinylpyrrolidone, a polysaccharide, or a mixture thereof. In yet another example, the non-ionic polymeric binder can have a weight average molecular weight from 400 Mw to 20,000 Mw, from 4,000 Mw to 10,000 Mw, or from 6,000 Mw to 8,500 Mw. Furthermore, the pigment to monovalent salt weight ratio in the ink composition can be from 5:1 to 25:1.

As noted, the present disclosure is drawn to ink compositions and methods of printing. In accordance with the present disclosure, an ionic polymeric dispersant can be used to disperse or suspend color pigments that would otherwise clump together and settle out of the liquid vehicle. Ionic polymers disperse the pigment by being adsorbed or otherwise attracted to the surface of the pigment particles. Two principal mechanisms of stabilization are steric stabilization and electrostatic stabilization. Steric stabilization occurs when the outer surface of a colored pigment becomes completely surrounded by ionic polymer, thereby preventing individual pigments from clumping together. Electrostatic stabilization occurs when the outer surface of the pigment becomes essentially equally charged (or charged at least enough to remain suspended) in the suspension fluid. The equal charge on the outer surface of individual colored pigments results in a Coulomb-repulsion that prevents individual colored pigments from clumping together. The ink compositions and methods described herein provide for control of electrostatic stabilization of ink compositions by manipulating a concentration of an added monovalent salt, thereby allowing for the enhancement or increase of color saturation of the ink compositions when printed on porous plain print media. In accordance with this, the addition of a monovalent salt to an ionic polymer dispersed pigmented ink can attenuate electrostatic stabilization. Thus, by controlling the concentration of monovalent salt, e.g., adding just enough to keep the dispersed pigment electrostatically stable without adding too much causing the pigment to crash, high color saturation, even on untreated porous plain paper, can be achieved.

However, in order to provide additional durability to images printed with such ink compositions, polymer binder can be added to bind the pigment to a surface of the print media. When polymer binder is used that is ionic in nature, either as a long polymer chain or as a polymer particulate that is relatively small compared to the size of the pigment, the binder particles tend to become attracted or adsorbed to the pigment surface, thereby enhancing electrostatic and steric stability. With respect to further stabilizing the pigment, this has traditionally been considered a good property; however, in the context of the present disclosure where the goal is to partially destabilize the pigment by adding monovalent salt, this added stabilization effectively reverses the saturation improvements achieved by the addition of the monovalent salt. On the other hand, by using non-ionic polymeric binder, the saturation improvements provided by the addition of the monovalent salt can be largely retained.

FIG. 1 graphically depicts the trend of how ionic polymeric binder can drastically impact color saturation in a negative manner, whereas, when using non-ionic polymeric binder, the decrease in color saturation is much less pronounced and remains acceptable. In other words, by retaining the reduced pigment stabilization promoted by the presence of the monovalent salt, the pigment can be kept near its crash point prior to printing so that it will be more likely to remain at or near the surface of the porous media substrate, e.g., uncoated cellulose-based fibrous paper, when printed. Thus, with the pigment more likely to remain at or near at the surface of the porous media substrate, the saturation is improved and the non-ionic polymeric binder can act to bind the pigment to a surface of the porous media substrate, e.g., plain paper.

In further detail, in addition to the aqueous liquid vehicle, there are four components that can be used, or which can be formulated together, to generate inks with improved saturation (or optical density in the case of black inks) and durability. These four components include the pigment, the ionic pigment dispersant used to disperse the pigment, the monovalent salt, and the non-ionic polymeric binder having the molecular weights described herein. The ionic strength of the monovalent salt that provides improved saturation will depend on the pigment and dispersant selected for use. The crash point can be determined experimentally by trial and error, or can be determined using colloidal vibrational current techniques. In any event, the crash point for every pigment is not universal, but crash points can be readily determined as described herein, followed by formulating ink compositions, in one example, that include an ionic strength of monovalent salt that approaches the crash point, but does not exceed the crash point, e.g., from 30% to 95% of the crash point. In other examples, the monovalent salt can be present at from 50% to 95% molar concentration of the crash point for the pigment in the ink composition. In still another example, the monovalent salt can be present at from 60% to 90% molar concentration of the crash point for the pigment in the ink composition. Thus, in one specific example with respect to the ink composition and method of printing, the pigment in the ink composition can be stable while in an inkjet fluid container, and when the ink composition is printed on a porous media substrate, aqueous liquid vehicle (in the ink composition) can be absorbed into the porous media substrate increasing the ionic strength of the monovalent salt around the pigment. This can cause the pigment to crash at the surface of the porous media substrate. Furthermore, the non-ionic polymeric binder can also bind the pigment to the porous media substrate. In further detail, by adding non-ionic polymeric binder having a weight average molecular weight from 400 Mw to 20,000 Mw, from 1,000 Mw to 12,000 Mw, from 4,000 Mw to 10,000 Mw, or from 6,000 Mw to 8,500 Mw, durability can be enhanced without sacrificing more than a deminimis amount of color saturation, if any.

Pigment crashing can occur when the stabilization forces, e.g., steric and electrostatic stabilization, do not provide enough stabilization to keep the pigments separated in space enough to prevent pigment crashing. This can cause the pigment to crash in on itself because there is not enough separation between particles. Thus, in the context of the present disclosure, "crash point" can be defined where a molar concentration (ionic strength) of a monovalent salt is just high enough that electrostatic stabilization provided by the ionic polymeric dispersant is unable to prevent the pigment from crashing. In other words, the crash point represents the molar concentration of the monovalent salt demarking the line between pigment stability and the pigment beginning to crash. In one example, the crash point of a pigment in an ink can be determined experimentally as otherwise described herein, e.g., trial and error or pigment colloidal vibrational current (CVI) techniques.

In accordance with one specific example, by adding a monovalent salt at a concentration in an ink that brings the ionic strength (measured as the molar concentration of the added salt) just below the crash point, when the ink is printed on a porous media substrate, such as plain paper or other non-ColorLok® paper (Color-Lok® media is available from HP, Inc., Palo Alto, Calif.), the liquid vehicle can absorb into the porous media substrate, thus increasing the molar concentration or ionic strength of the monovalent salt around the pigment surface (or in vicinity of the pigment particle). Because the ionic strength of the monovalent salt was close to the crash point for the pigment in the ink reservoir (prior to printing), e.g., from 30% to 95% of the crash point for the pigment, once just a small portion of the liquid vehicle rapidly absorbs into the substrate, the pigment crashes at the surface thereof. Thus, much of the pigment remains at the surface when it crashes and the color saturation can be increased compared to inks that are otherwise identical, but which have less (or no) monovalent salt therein. With the pigment at the surface, to provide desired durability, the non-ionic polymeric binder described herein can provide durability enhancement by protecting the surface printed pigment.

With specific reference to the pigment, the pigment is not particularly limited. The particular pigment used will depend on the colorist's desires in creating the composition. Pigment colorants can include cyan, magenta, yellow, red, blue, orange, green, pink, black, violet, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof such as Pigment Blue 15, Pigment Blue 15:3, and Pigment Green 36. Representative examples of quinacridones include Pigment Orange 48, Pigment Orange 49, Pigment Orange 43, Pigment Violet 23, Pigment Green 36, Pigment Red 122, Pigment Red 192, Pigment Red 202, Pigment Red 206, Pigment Red 209, Pigment Violet 19, and Pigment Violet 42. Representative examples of anthraquinones include Pigment Red 43, Pigment Red 194, Pigment Red 177, Pigment Red 216, and Pigment Red 226. Representative examples of perylenes include Pigment Red 123, Pigment Red 190, Pigment Red 189, and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Other pigments that can be used include Pigment Blue 15:3, DIC-QA Magenta Pigment, Pigment Red 150, and Pigment Yellow 74. Such pigments are commercially available in powder, press cake, or dispersions form from a number of sources.

If desired, two or more pigments can be combined to create novel color compositions, but the ionic polymeric dispersant to pigment weight ratio and the total pigment load may be considered based on the entire pigment load (cumulative based on all pigments). In one example, a pigment combination can form a red ink by combining a magenta pigment and a yellow pigment, e.g. 50-60 wt % magenta pigment and 40-50 wt % yellow pigment. In another example, the pigment combination can form a green ink by combining a yellow pigment and a cyan pigment, e.g., 65-75 wt % yellow pigment and 25-35 wt % cyan pigment. In yet another example, the pigment combination can form a blue ink by combining cyan pigment and magenta pigment, e.g., 85-95 wt % cyan pigment and 5-15 wt % magenta pigment. These colors can be alternatively generated by printing various ratios of cyan, magenta, yellow, black, or other colored inks on the print media from multiple ink compositions.

The pigments of the present disclosure can be from nanometers to a micron in size, e.g., 20 nm to 1 μm. In one example the pigment can be from about 50 nm to about 500 nm in size. Pigment sizes outside this range can be used if the pigment can remain dispersed and provide adequate printing properties.

The pigment load in the ink compositions can range from 1 wt % to 9 wt %. In other examples, the pigment load can be from 2 wt % to 9 wt %, from 3 wt % to 9 wt %, from 3 wt % to 7 wt %, or from 5 wt % to 9 wt %. In a further example, the pigment load can be from 4 wt % to 6 wt %, or from 6 wt % to 8 wt %.

With specific reference to the ionic polymeric dispersant, this component can be any suitable ionic polymeric dispersant that is sufficient to form an attraction with the pigment particles. The ionic polymeric dispersant should not be confused with the non-ionic polymeric binder, as these polymers are separate components. Thus, unlike the non-ionic polymeric binder, the ionic polymeric dispersant has a net charge. The ionic polymeric dispersant can include acid groups, and/or includes both hydrophilic moieties and hydrophobic moieties. In one example, the dispersant may have an acid number ranging from 40 to 180. The ratio of hydrophilic moieties to the hydrophobic moieties can range widely, but in certain specific examples, the weight ratios can be from about 1:5 to about 5:1. In another example, the ratio of hydrophilic moieties to the hydrophobic moieties can range from about 1:3 to about 3:1. In yet another example, the ratio of hydrophilic moieties to the hydrophobic moieties can range from about 1:2 to about 2:1. In one example, the ionic polymeric dispersant can include a hydrophilic end and a hydrophobic end. The polymer can be a random copolymer or a block copolymer or a graft copolymer (comb polymer).

The particular ionic polymeric dispersant can vary based on the pigment; however, as mentioned, the hydrophilic moieties typically include acid groups. Some suitable acid monomers for the ionic polymeric dispersant include acrylic acid, methacrylic acid, carboxylic acid, sulfonic acid, phosphonic acid, and combinations of these monomers. The hydrophobic monomers can be any hydrophobic monomer that is suitable for use, but in one example, the hydrophobic monomer can be styrene. Other suitable hydrophobic monomers can include isocyanate monomers, aliphatic alcohols, aromatic alcohols, diols, polyols, or the like, for example. In one specific example, the ionic polymeric dispersant includes polymerized monomers of styrene and acrylic acid at a 5:1 to 1:5 weight ratio.

The weight average molecular weight (Mw) of the ionic polymeric dispersant can vary to some degree, but in one example, the weight average molecular weight of the ionic polymeric dispersant can range from about 5,000 Mw to about 20,000 Mw. In another example, the weight average molecular weight can range from about 7,000 Mw to about 12,000 Mw. In another example, the weight average molecular weight ranges from about 5,000 Mw to about 15,000 Mw. In yet another example, the weight average molecular weight ranges from about 8,000 Mw to about 10,000 Mw.

Turning now to the non-ionic polymeric binder (which is different than the ionic polymeric dispersant described above), these particles can be any non-ionic polymeric material that can act to bind pigment to a media substrate upon printing, but which do inter unfavorably interact with the charge chemistry in the ink composition as a whole. Thus, because the non-ionic polymeric binder has no net charge, the pigment and ionic polymeric dispersant (charged) do not appreciably interact with the non-ionic polymeric binder beyond general Van der Waals interactions.

In further detail, the non-ionic polymeric binder can be in the form of a long chain polymer, either branched or straight chain. In another example, the non-ionic polymeric binder can be water soluble, and in other examples, can be miscible with water. Furthermore, the non-ionic polymeric binder can be a random copolymer or a block copolymer or a graft copolymer (comb polymer), for example. Additionally, the non-ionic polymeric binder can be prepared to have any of a number of different morphologies. For example, the polymer may be a homopolymer prepared from a single monomer, or a heteropolymer prepared from multiple monomers. As mentioned, the non-ionic polymeric binder can be a long chain polymer, but it can also be in the form of a polymer particle, provided the outer surface of the particle is non-ionic and does not appreciably interact with the pigment or the ionic polymeric dispersant. To illustrate one type of non-ionic polymeric binder by way of example only, polyethylene glycol polymers ranging in weight average molecular weight from 400 Mw to 20,000 Mw tend to be long chain polymers that can be either water soluble or fully miscible in water. These polymers, within this weight range, can be acceptable for use as the non-ionic polymeric binder component in the ink compositions of the present disclosure. More generally, the non-ionic polymeric binder can be selected from any of a number of non-ionic polymers, such as one or more of a polysorbate, a poloxamer, a polyglycol, a polyalcohol, an ethoxylated polyalcohol, a polyamine, a polyamide, a polyimine, a polyacrylamide, a polyvinylpyrrolidone, a polysaccharide, or a mixture thereof.

Suitable polysorbates include, without limitation, polyoxyethylene sorbitan-20 monolaurate (polysorbate 20), polyoxyethylene sorbitan-20 monopalmitate (polysorbate 40), polyoxyethylene sorbitan-20 monostearate (polysorbate 60), or polyoxyethylene sorbitan-20 monooleate (polysorbate 80).

Suitable poloxamers include, without limitation, poloxamer 101, poloxamer 105, poloxamer 108, poloxamer 122, poloxamer 123, poloxamer 124, poloxamer 181, poloxamer 182, poloxamer 183, poloxamer 184, poloxamer 185, poloxamer 188, poloxamer 212, poloxamer 215, poloxamer 217, poloxamer 231, poloxamer 234, poloxamer 235, poloxamer 237, poloxamer 238, poloxamer 282, poloxamer 284, poloxamer 288, poloxamer 331, poloxamer 333, poloxamer 334, poloxamer 335, poloxamer 338, poloxamer 401, poloxamer 402, poloxamer 403, poloxamer 407, poloxamer 105 benzoate, or poloxamer 182 dibenzoate. Poloxamers are triblock copolymers including a block of polyoxyethylene, followed by another block of polyoxypropylene, followed by a block of polyoxyethylene. The average number of units of polyoxyethylene and polyoxypropylene varies based on the number associated with the polymer. Poloxamer 101, for example, is the smallest and includes a block with an average of two (2) units of polyoxyethylene, a block with an average of sixteen (16) units of polyoxypropylene, and again a block with an average of two (2) units of polyoxyethylene. To determine the molecular mass, and thus the weight average molecular weight, for these non-ionic polymeric binders, the first two digits of the numerical identifier multiplied by 100 provides the approximate molecular mass of the polyoxypropylene block, and the last digit is multiplied by 10 to provide the percentage polyoxyethylene content found in the remaining A blocks. For example, poloxamer 407 has polyoxypropylene molecular mass of 4,000 g/mol and a 70% polyoxyethylene content.

Suitable polyglycols can include, without limitation, polymethylene glycol (PMG), polyethylene glycol (PEG), polypropylene glycol (PPG), polytetrahydrofuran, polytrimethylene ether glycol, or copolymers thereof. Furthermore, suitable polyalcohols or ethoxylated polyalcohols can include, without limitation, polyvinyl alcohol (PVA) or polyethylene oxide resins (e.g., Polyox™ from Dow Chemical). In still other examples, suitable polyamines, polyamides, or polyimines can include, without limitation polyethylenimine, polyacrylamide, N-(2-hydroxypropyl) methacrylamide (HPMA), polyethylene-imines, etc. Suitable polyvinylpyrrolidones can include, without limitation, poly(n-vinylpyrrolidone)[e.g E1201], polyvinylpyrrolidone-co-pyrrolidone, methacrylamide chloride-graft-poly(N-vinyl pyrrolidone). Suitable polysaccharides can include, without limitation, hydroxymethyl cellulose, ethyl hydroxyethyl cellulose, hydroxyethyl cellulose, hydroxypropyl cellulose, hydroxyethyl methylcellulose, hydroxypropyl methylcellulose, guar gum, locust bean gum, sucrose, agarose, etc.

As mentioned, the non-ionic polymeric binder and the pigment (particles) can be prepared co-dispersed (or even solubilized in the case of the non-ionic binder) so that the non-ionic polymeric binder does not appreciably interact with the pigment or the ionic polymeric dispersant used to disperse the pigment. As mentioned previously, the use of ionic polymeric binder can be undesirable because it can lead to reduced saturation when printed on plain paper and other porous types of media. Non-ionic polymeric binder does not tend to have such a big impact on color saturation in these types of ink compositions. Thus, FIG. 2 shows a simplified schematic illustrating the differences in interactions between the pigment 10 and ionic polymeric dispersant 12, with ionic polymeric binder 14 compared to non-ionic polymeric binder 16. Specifically, when ionic polymeric binder 14 is used, there is more pigment surface interaction. On the other hand, when non-ionic polymeric binder 16 is used as the binder, there is less surface interaction and thus, a lower propensity to modify the pigment stability (or lack thereof) in the ink composition that is generated by the monovalent salt to improve saturation. In other words, unlike when ionic polymeric binder is used, the pigment is not significantly stabilized away from its crash point by the presence of the non-ionic polymeric binder, mitigating the saturation improving effect provided by the monovalent salt (which is added to cause the pigment to approach the crash point and improve saturation).

In further detail, different concentrations of non-ionic polymeric binder can be used based on the ink formulation ingredients, ink color, or other ink properties. Color pigment choice can also be considered with respect to the concentration of the polymeric pigment that is added. In one example, the pigment can be cyan, magenta, or yellow, and the non-ionic polymeric binder can be present in the ink composition at from 0.5 wt % to 3 wt %, or from 0.75 wt % to 2.5 wt %. In another example, when the pigment is cyan, the non-ionic polymeric binder can be present in the ink composition at from 0.5 wt % to 2 wt %. In another example, when the pigment is yellow, the non-ionic polymeric binder can be present in the ink composition at from 0.5 wt % to 2 wt %. In still another example, when the pigment is magenta, the non-ionic polymeric binder can be present in the ink composition at from 1 wt % to 3 wt %. In still another example, when the pigment is black, the non-ionic polymeric binder can be present in the ink composition at from 0.75 wt % to 2.5 wt %. Of course, weight ratios outside of these ranges can also be used. For example, these non-ionic polymeric binder ranges can be expanded or narrowed based on various considerations, but in general, the polymeric polymer particles can be more generally present in the ink composition at from 0.5 wt % to 5 wt %.

Turning now to the monovalent salt, any of a number of salts (including monovalent alkali metal salts, monovalent non-metallic salts, or combinations thereof) can be used. Examples of monovalent non-metallic salts can include monovalent quaternary ammonium salts [$NR^{+4}$], where R is an alkyl group or an aryl group organic salts), e.g., $NH_4F$, $NH_4Cl$, $NH_4NO_3$, $(NH_4)_2SO_4$, and/or $(NH_4)_3PO_4$. Examples of monovalent alkali metal salts that can be used include LiF, NaF, KF, RbF, CsF, LiCl, KCl, NaCl, CsCl, RbCl, LiBr, CsBr, RbBr, KBr, NaBr, $NH_4Br$, LiI, NaI, KI, RbI, CsI, $NaNO_3$, $KNO_3$, $LiNO_3$, $RbNO_3$, $CsNO_3$, $KNO_3$, $Li_2SO_4$, $Na_2SO_4$, $K_2SO_4$, $Cs_2SO_4$, $Rb_2SO_4$, $Li_3PO_4$, $Na_3PO_4$, $K_3PO_4$, $Rb_3PO_4$, $Cs_3PO_4$, $Li_3PO_4$, monosodium citrate, disodium citrate, trisodium citrate, potassium citrate, rubidium citrate, cesium citrate, lithium citrate, sodium ascorbate, potassium ascorbate, lithium ascorbate, lithium acetate, sodium acetate, potassium acetate, cesium acetate, rubidium acetate, monosodium glutamate, and/or potassium glutamate. Essentially, any salt that includes a monovalent alkali metal cation or a monovalent non-metallic cation (ionically associated at one or more location to an anion) can be used.

The monovalent salts can be present in the ink compositions at from 0.1 wt % to 1.5 wt %. Typically, 1.2 wt % monovalent salt provides an acceptable upper limit of salt content. However, in addition to these weight percentage ranges used to establish the monovalent salt concentration, in some cases, a more detailed or specific range or concentration for these monovalent salts can be additionally used. For example, the salt can more be present in the ink at from 0.1 wt % to 1.5 wt %, 0.25 wt % to 1.2 wt %, 0.3 wt % to 1 wt %, or from 0.3 wt % to 0.8 wt %.

These weight ranges can be provided for guidance and to emphasize that the range of salt used is typically low, but above at least a minimum threshold of 0.1 wt %, and often above 0.25 wt %, to generate improved saturation. When combining specific pigments and specific monovalent salts, ionic strength based on molar concentration can be further used to provide more specific range information. For example, the molar concentration of the monovalent salt can be from 30% to 95% of the crash point, or from 50% to 90% of the crash point, or from 60% to 85% of the crash point of the pigment in the ink composition. The "crash point" can be defined by a molar concentration of the monovalent salt where its ionic strength in the ink is just high enough that electrostatic stabilization provided by the dispersant is not strong enough to prevent the pigment from crashing in an ink reservoir. In accordance with this, depending on the pigment and monovalent salt selected, the crash point of the pigment may be at a molar concentration of monovalent salt from 0.06 M to 0.3 M, or from 0.1 M to 0.25 M. In other more specific examples, for certain magenta or yellow pigments, the crash point may be at a molar concentration of monovalent salt of 0.08 M to 0.22 M or from 0.12 M to 0.18 M; and/or for certain cyan pigments, the crash point in the ink may be at a molar concentration of monovalent salt of 0.12 M to 0.29 M or from 0.15 M to 0.25 M. Ink compositions with mixtures of pigments used for other colors, e.g., Red, Blue, Green, Purple, Pink, Orange, etc., can be adjusted so that neither pigment reaches its crash point, for example.

One reason crash point is defined based on ionic strength rather than by weight percentage has to do, in part, with the varying molecular weights of the monovalent salts that can be used. That being stated, a weight range from about 0.1 wt % to about 1.5 wt %, or from about 0.25 wt % to about 1.2 wt %, for the monovalent salt concentration in the ink may be suitably broad to cover many of the various pigment and monovalent salt concentration combinations. In further detail, some pigments and monovalent salt concentrations may provide crash points that are close to either end of the 0.1 wt % or 1.5 wt % monovalent salt concentration range. To illustrate, monovalent salt concentrations typically below about 0.1 wt % may only provide minimal saturation improvement, even with monovalent salts that are relatively molecularly light, e.g., NaCl, KCl, NaF, KF, etc. Thus, concentrations of 0.1 wt % or more, or even about 0.25 wt % or more, tend to provide more noticeable saturation improvement (but may cause crashing at lower weight percentages). On the other hand, though monovalent salt concentrations above about 1.5 wt % are typically more than enough to crash most pigments (which is undesirable while in the ink reservoir), for salts having a heavier molecular weight, e.g., CsBr, RbI, $Cs_2SO_4$, $Rb_2SO_4$, etc., but which may provide a similar ionic strength as lighter monovalent salts that may alternatively be included at lower weight percentages, monovalent salt concentrations approaching the 1.5 wt % upper limit may be suitable for use (where a lighter molecular weight monovalent salt with similar ionic properties may cause crashing at a lower weight percentage in the ink composition). For example, a heavy monovalent salt may not provide as much ionic strength per weight percent as a lighter monovalent salt, so a higher weight percentage of the heavier monovalent could be used to formulate an ink having an ionic strength close to the crash point. Likewise, if a heavier monovalent salt is used, 0.1 wt % of the monovalent salt may not provide enough ionic strength to achieve improved color saturation or black optical density, depending in part on the ink formulation density.

In accordance with this, with respect to the monovalent salt, it is noted that weight percentage ranges, e.g., 0.1 wt % to 1.5 wt %, 0.25 wt % to 1.2 wt %, 0.3 wt % to 1 wt %, from 0.3 wt % to 0.8 wt %, etc., and ionic strength ranges, e.g., 0.06 M to 0.3 M, 0.1 M to 0.25 M, 0.08 M to 0.22 M, 0.12 M to 0.18 M, 0.12 M to 0.29 M, 0.15 M to 0.25 M, etc., can be combined together in any combination to provide a monovalent salt concentration profile that is desired for an ink composition to enhance color saturation or optical density. Again, when designing such an ink, the ionic strength of the monovalent salt may also be less than the crash point of the specific pigment/monovalent salt selected for use in the ink composition, e.g., from 30% to 95%, 50% to 95%, 60% to 90%, etc., of the ionic strength of the pigment crash point. Furthermore, pigment concentration ranges, e.g., 1 wt % to 9 wt %, 2 wt % to 9 wt %, 2 wt % to 8 wt %, 3 wt % to 9 wt %, 3 wt % to 7 wt %, 5 wt % to 9 wt %, 4 wt % to 6 wt %, 6 wt % to 8 wt %, etc., and/or pigment to monovalent salt ratio, e.g., 5:1 to 25:1, 9:1 to 20:1, 10:1 to 17:1, etc., can also be combined together with any of the monovalent salt weight percentage ranges and/or the ionic strength ranges (in any combination) to provide an ink profile that improves color saturation or optical density. Likewise, non-ionic polymeric binder having a weight average molecular weight from 400 Mw to 20,000 Mw, form 1,000 Mw to 12,000 Mw, from 4,000 Mw to 10,000 Mw, or from 6,000 Mw to 8,500 Mw; and concentrations from 0.5 wt % to 5 wt %, 0.5 wt % to 2 wt %, 1 wt % to 3 wt %, etc., can be adjusted to provide an ink profile that provides good durability while retaining, improving, or nearly retaining color saturation or optical density improvements provided by the addition of the monovalent salt.

In order to formulate the pigment dispersion into an ink composition, the pigment dispersion (pigment and ionic polymeric dispersant), monovalent salt, and non-ionic polymeric binder can be combined with an aqueous liquid vehicle. The liquid vehicle is not particularly limited. The liquid vehicle can include additional polymers, solvents, surfactants, antibacterial agents, UV filters, and/or other additives. In one example, along with other parameters used to determine the crash point and charge stabilization, a lower pigment load may provide for the ability to be more flexible with other parameters, e.g., concentration of dispersant and/or monovalent salt may be lowered with acceptable results. However, higher pigment loads can likewise be used with success as well.

As the liquid vehicle is aqueous, water is one of the major solvents (present at 10 wt % or more, and often 30 wt % or more, or even 50 wt % or more), and usually there is one or more organic co-solvent. In some examples, water can be present in an amount representing from about 20 wt % to about 90 wt %, or can be present in an amount representing from about 30 wt % to about 80 wt % of the total ink composition. If an organic co-solvent is added to prepare the pigment dispersion, that co-solvent can be considered when formulating the ink composition using the pigment dispersion. Examples of suitable classes of co-solvents include polar solvents, such as alcohols, amides, esters, ketones, lactones, and ethers. In additional detail, solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, 2-ethyl-2-(hydroxymethyl)-1, 3-propane diol (EPHD), glycerol, N-methylpyrrolidone (NMP), dimethyl sulfoxide, sulfolane, glycol ethers, alkyldiols such as 1,2-hexanediol, and/or ethoxylated glycerols such as LEG-1, etc. The co-solvent can be present in the ink composition from 5 wt % to about 75 wt % of the total ink composition. In one example, the solvent can be present in the ink composition at about 10 wt % to about 50 wt %, or from about 15 wt % to 35 wt %.

The liquid vehicle can also include surfactant. In general, the surfactant(s) can be water soluble and may include alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, fluorosurfactants and alcohol ethoxylated surfactants can be used as surfactants. In one example, the surfactant can be Tergitol™ TMN-6, which is available from Dow Chemical Corporation. The surfactant or combinations of surfactants, if present, can be included in the ink composition at from about 0.001 wt % to about 10 wt % and, in some examples, can be present at from about 0.001 wt % to about 5 wt % of the ink compositions. In other examples the surfactant or combinations of surfactants can be present at from about 0.01 wt % to about 3 wt % of the ink compositions.

Consistent with the formulations of this disclosure, various other additives may be employed to provide desired properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Acticide® (Thor Specialties Inc.), Nuosept™ (Nudex, Inc.), Ucarcide™ (Union carbide Corp.), Vancide® (R.T. Vanderbilt Co.), Proxel™ (ICI America), and combinations thereof. Sequestering agents such as EDTA (ethylene diamine tetra acetic acid) may be included to eliminate the deleterious effects of heavy metal impurities and buffer solutions may be used to control the pH of the ink. Viscosity modifiers and buffers may also be present, as well as other additives known to those skilled in the art to modify properties of the ink as desired.

The ink compositions described above are particularly suited to provide good color saturation on non-specialized porous print media (even uncoated paper) but can be suitable for use on any type of substrate of print media. The reason these inks are particularly useful with plain paper is that color saturation is diminished fairly significantly as colorant and liquid vehicle is soaked into the media substrate. This problem is enhanced when the charge stabilization of the pigment is too high. Pigment formulators tend to stabilize inks with high charges, but as discussed herein, such high charge stabilization may not be the best choice for plain paper when trying to enhance saturation. Adding the right, relatively low, concentration of a monovalent salt and non-ionic polymeric binder as described herein can provide higher saturation and durability as the pigment crashes on the paper when liquid vehicle becomes absorbed into the paper fibers.

Suitable examples of porous media substrates that can be used include, but are not limited to include, cellulose based paper, fiber based paper, inkjet paper, nonporous media, standard office paper, swellable media, microporous media, photobase media, offset media, coated media, uncoated media, fabrics, and woven substrate. Though the ink compositions of the present disclosure may work on these and other types of porous media substrates, treated or coated media tend not need the assistance of the ink compositions of the present disclosure to provide high optical density or color saturation thereof. This may be because the coating or treatment itself can contribute to the improved optical density or color saturation. Thus, in one example, the ink compositions of the present disclosure can be used and work surprisingly well on plain paper substrates, such as uncoated cellulose-based fibrous paper, and particularly papers having a calcium chloride content of less than 2,500 µg/g of paper. Papers that may be certified as ColorLok® media, as certified by HP, Inc., tend to have a calcium chloride content that is much higher than 2,500 µg/g of paper. Thus, even non-ColorLok papers can work well in accordance with examples of the present disclosure.

In another example, as shown in FIG. 3, a method of printing 300 can include inkjetting 310 an ink composition from a fluid container through an inkjet printing orifice onto a porous media substrate. The ink composition can include an aqueous liquid vehicle, from 1 wt % to 9 wt % pigment dispersed in the aqueous liquid vehicle by an ionic polymeric dispersant associated with pigment, from 0.5 wt % to 5 wt % non-ionic polymeric binder having a weight average molecular weight from 400 Mw to 20,000 Mw, and from 0.1 wt % to 1.5 wt % monovalent salt. In one example, the porous media substrate can be an uncoated cellulose-based fibrous paper having a calcium chloride content less than 2,500 µg/g of paper. In one specific example, another step can include binding the pigment particles to a surface of the porous media substrate using the non-ionic polymeric binder. In another specific example, the method can further include crashing the pigment at the surface of the porous media substrate. Thus, pigment can be stable while in the fluid container, and when the ink composition is printed on the porous media substrate, the aqueous liquid vehicle can be absorbed in the porous media substrate, thus increasing the ionic strength of the monovalent salt around the pigment (or in vicinity of the pigment particle), e.g., at a surface of the porous media substrate. This can cause the pigment to crash at the surface of the porous media substrate without contact with a separate crashing agent.

It is noted that, as used in this specification and the appended claims, the singular forms "a," "an," and "the" include plural referents unless the content clearly dictates otherwise.

As used herein "aqueous liquid vehicle" or "liquid vehicle" refers to a water-containing liquid medium in which the pigment, ionic polymeric dispersant, and monovalent salt are admixed in to form an ink composition. In addition to water, the aqueous liquid vehicle can include several components including but not limited to organic co-solvents, surfactants, biocides, UN filters, preservatives, and other additives.

When referring to an "ionic polymeric dispersant" herein, this refers to a separate additive that is included with the pigment to disperse the pigment. The ionic polymeric dispersant can be adsorbed or attracted to the surface of the pigment, but is not covalently attached as is the case with self-dispersed pigments. The ionic polymeric dispersant is separate and distinct from the non-ionic polymeric binder described herein.

Color "saturation" refers to the intensity of color, expressed by the degree from which it differs from white. It can be expressed as C/L*. Notably, saturation relates to color. However, in accordance with examples of the present disclosure, when a black pigment is used, optical density (OD) rather than color saturation can be used to describe the increased intensity. Thus, examples and discussion herein related to color saturation may also be relevant to optical density with respect to black pigment. Thus, any disclosure related to color saturation should be read to include black optical density (for black inks), whether explicitly stated so in a specific context or not.

Converting molar concentration to weight percent (e.g., for the monovalent salt) includes taking into account the molecular weight of the monovalent salt and the density of the liquid ink. Typically, the density of the ink can be from about 1.04 $g/cm^3$ to about 1.12 $g/cm^3$, or from about 1.06 $g/cm^3$ to about 1.1 $g/cm^3$, or so, depending on the ink formulation.

Notably, there may be some added ingredients that may include some incidental concentrations of monovalent salt that are inherently in the formulation of the additive. This monovalent salt is not calculated when determining the molar concentration of the added monovalent salt unless the salt that is already present in an additive is identical to the salt being added to increase the ionic strength. That being the case, typically, the "background" monovalent salt concentrations are typically well below 0.1 wt %.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also individual weights such as 2 wt %, 11 wt %, 14 wt %, and sub-ranges such as 10 wt % to 20 wt %, 5 wt % to 15 wt %, etc.

When referring to an increase or improvement in performance, the increase or improvement is based on printing using Hammermill® Great White 30% Recycled Media as the print medium which was available at the time of filing of the disclosure in the United States Patent and Trademark Office.

EXAMPLES

The following examples illustrate the technology of the present disclosure. However, it is to be understood that the following is only exemplary or illustrative of the application of the principles of the presented formulations and methods. Numerous modifications and alternative methods may be devised by those skilled in the art without departing from the spirit and scope of the present disclosure. The appended claims are intended to cover such modifications and arrangements. Thus, while the technology has been described above with particularity, the following provide further detail in connection with what are presently deemed to be certain acceptable examples.

Example 1—Benefit of Added Monovalent Salt on Saturation

For comparison purposes, three inks were prepared that did not include any added monovalent salt or added polymeric binder. These inks were prepared to generate a baseline ink saturation level on two types of plain porous media, namely Hammermill Great White 30% Recycled Paper (GW30) and Georgia Pacific Paper (GP). The saturation (C/L*) for each of these inks is provided in Table 1 below. In further detail, to each of the inks, 0.6 wt % potassium chloride (KCl) was added and the saturation measured. As can also be seen also in Table 1 below, by adding 0.6 wt % potassium chloride to the pigmented ink (without added polymeric binder) increased the color saturation on GW30 and GP media. For example, on GW30 media, the cyan saturation increased from 1.0 to 1.14 (C/L*), the magenta saturation increased from 1.14 to 1.23 (C/L*), and the yellow saturation increased from 0.94 to 1.0 (C/L*). Similar improvements were achieved on GP media, e.g., the cyan saturation increased from 0.99 to 1.13 (C/L*), the magenta saturation increased from 1.06 to 1.16, and the yellow saturation increased from 0.90 to 0.96.

TABLE 1

| Cyan, Magenta, and Yellow Inks without Monovalent Salt and Polymeric Binder | | | | |
|---|---|---|---|---|
| Ingredient | Class | C0 | M0 | Y0 |
| 2-Pyrrolidinone | Organic Co-solvent | 9 | 9 | 9 |
| EHPD | Organic Co-solvent | 10 | 10 | 10 |
| Glycerol | Organic Co-solvent | 4 | 4 | 4 |
| LEG-1 | Organic Co-solvent | 0.75 | 0.75 | 0.75 |
| Tergitol ® TMN6 | Surfactant | 0.72 | 0.72 | 0.72 |
| Acticide ® B20 | Biocide | 0.16 | 0.16 | 0.16 |
| Acticide ® M20 | Biocide | 0.07 | 0.07 | 0.07 |
| Cyan Pigment | Styrene-acrylic Dispersed Pigment | 6 | — | — |
| Magenta Pigment 1 | Styrene-acrylic Dispersed Pigment | — | 3 | — |
| Magenta Pigment 2 | Styrene-acrylic Dispersed Pigment | — | 3 | — |
| Yellow Pigment | Styrene-acrylic Dispersed Pigment | — | — | 6 |
| Water | Solvent | Balance | Balance | Balance |
| Saturation on GW30 (C/L*) | | 1.00 | 1.14 | 0.94 |
| Saturation on GW30 (C/L*) + 0.6 wt % KCl | | 1.14 | 1.23 | 1.00 |
| Saturation on GP (C/L*) | | 0.99 | 1.06 | 0.90 |
| Saturation on GP (C/L*) + 0.6 wt % KCl | | 1.13 | 1.16 | 0.96 |

Example 2—Preparation of Ink Compositions with Pigment Dispersions, Monovalent Salt, and Non-Ionic Polymeric Binder To determine how best to improve the durability of the salt-containing ink compositions from Table 1 (referred to more specifically below in Table 2 as M1, C1, and Y1, respectively), five pigmented inks were formulated for each of cyan, magenta, and yellow pigments, respectively, and each of the pigments was dispersed with an ionic polymeric dispersant (styrene-acrylic polymer). Thus, a total of fifteen different inkjet ink compositions (five cyan, five magenta, and five yellow) were prepared. For each color, the first ink was prepared without any polymeric binder to provide a color saturation target which was obtained by added monovalent salt (improved data provided in FIG. 1). Additionally, for each color, a second ink was prepared to further include urethane acrylate polymeric binder (number average particle size about Mn=1.05 nm). Still further, for each color, a third ink, a fourth ink, and a fifth ink was prepared which included non-ionic polymeric binder (PEG 400 Mw, PEG 7,500 Mw, and 20,000 Mw, respectively). Again, all of the inkjet inks included a monovalent salt (potassium chloride) which was added at a small concentration to enhance the saturation of the various pigments when printed on plain paper porous media, namely GW30 and GP as set forth in Example 1. The fifteen ink formulations, five for each color, are shown below in Tables 1-3, as follows. Again, C1, M1, and Y1 are the same inks described in Example 1 where the monovalent salt (KCl) was added at 0.6 wt %.

TABLE 2

| Cyan Inks | | | | | | |
|---|---|---|---|---|---|---|
| Ingredient | Class | C1 | C2 | C3 | C4 | C5 |
| 2-Pyrrolidinone | Organic Co-solvent | 9 | 9 | 9 | 9 | 9 |
| EHPD | Organic Co-solvent | 10 | 10 | 10 | 10 | 10 |
| Glycerol | Organic Co-solvent | 4 | 4 | 4 | 4 | 4 |
| LEG-1 | Organic Co-solvent | 0.75 | 0.75 | 0.75 | 0.75 | 0.75 |
| Tergitol ® TMN6 | Surfactant | 0.72 | 0.72 | 0.72 | 0.72 | 0.72 |
| Acticide ® B20 | Biocide | 0.16 | 0.16 | 0.16 | 0.16 | 0.16 |
| Acticide ® M20 | Biocide | 0.07 | 0.07 | 0.07 | 0.07 | 0.07 |
| Potassium Chloride | Monovalent Salt | 0.6 | 0.6 | 0.6 | 0.6 | 0.6 |
| Urethane-Acrylate Polymer | Charged polymeric binder | — | 1 | — | — | — |
| Polyethylene glycol (Mw = 400) | Water-soluble, Non-ionic Polymeric Binder | — | — | 1 | — | — |
| Polyethylene glycol (Mw = 7,500) | Water-soluble, Non-ionic Polymeric Binder | — | — | — | 1 | — |
| Polyethylene glycol (Mw = 20,000) | Water-soluble, Non-ionic Polymeric Binder | — | — | — | — | 1 |

TABLE 2-continued

| | | Cyan Inks | | | | |
|---|---|---|---|---|---|---|
| Ingredient | Class | C1 | C2 | C3 | C4 | C5 |
| Cyan Pigment | Styrene-acrylic Dispersed Pigment | 6 | 6 | 6 | 6 | 6 |
| Water | Solvent | Bal | Bal | Bal | Bal | Bal |

Tergitol ® is available from Sigma Aldrich; and Acticide ® is available from Thor Group Limited.

TABLE 3

| | | Magenta Inks | | | | |
|---|---|---|---|---|---|---|
| Ingredient | Class | M1 | M2 | M3 | M4 | M5 |
| 2-Pyrrolidinone | Organic Co-solvent | 9 | 9 | 9 | 9 | 9 |
| EHPD | Organic Co-solvent | 10 | 10 | 10 | 10 | 10 |
| Glycerol | Organic Co-solvent | 4 | 4 | 4 | 4 | 4 |
| LEG-1 | Organic Co-solvent | 0.75 | 0.75 | 0.75 | 0.75 | 0.75 |
| Tergitol ® TMN6 | Surfactant | 0.72 | 0.72 | 0.72 | 0.72 | 0.72 |
| Acticide ® B20 | Biocide | 0.16 | 0.16 | 0.16 | 0.16 | 0.16 |
| Acticide ® M20 | Biocide | 0.07 | 0.07 | 0.07 | 0.07 | 0.07 |
| Potassium Chloride | Monovalent Salt | 0.6 | 0.6 | 0.6 | 0.6 | 0.6 |
| Urethane-Acrylate Polymer | Charged Polymeric Binder | — | 2 | — | — | — |
| Polyethylene glycol (Mw = 400) | Water-soluble, Non-ionic Polymeric Binder | — | — | 2 | — | — |
| Polyethylene glycol (Mw = 7,500) | Water-soluble, Non-ionic Polymeric Binder | — | — | — | 2 | — |
| Polyethylene glycol (Mw = 20,000) | Water-soluble, Non-ionic Polymeric Binder | — | — | — | — | 2 |
| Magenta Pigment 1 | Styrene-acrylic Dispersed Pigment | 3 | 3 | 3 | 3 | 3 |
| Magenta Pigment 2 | Styrene-acrylic Dispersed Pigment | 3 | 3 | 3 | 3 | 3 |
| Water | Solvent | Bal | Bal | Bal | Bal | Bal |

Tergitol ® is available from Sigma Aldrich; and Acticide ® is available from Thor Group Limited.

TABLE 4

| | | Yellow Inks | | | | |
|---|---|---|---|---|---|---|
| Ingredient | Class | Y1 | Y2 | Y3 | Y4 | Y5 |
| 2-Pyrrolidinone | Organic Co-solvent | 9 | 9 | 9 | 9 | 9 |
| EHPD | Organic Co-solvent | 10 | 10 | 10 | 10 | 10 |
| Glycerol | Organic Co-solvent | 4 | 4 | 4 | 4 | 4 |
| LEG-1 | Organic Co-solvent | 0.75 | 0.75 | 0.75 | 0.75 | 0.75 |
| Tergitol ® TMN6 | Surfactant | 0.72 | 0.72 | 0.72 | 0.72 | 0.72 |
| Acticide ® B20 | Biocide | 0.16 | 0.16 | 0.16 | 0.16 | 0.16 |
| Acticide ® M20 | Biocide | 0.07 | 0.07 | 0.07 | 0.07 | 0.07 |
| Potassium Chloride | Monovalent Salt | 0.6 | 0.6 | 0.6 | 0.6 | 0.6 |
| Urethane-Acrylate Polymer | Charged polymeric binder | — | 1 | — | — | — |
| Polyethylene glycol (Mw = 400) | Water-soluble, Non-ionic Polymeric Binder | — | — | 1 | — | — |
| Polyethylene glycol (Mw = 7,500) | Water-soluble, Non-ionic Polymeric Binder | — | — | — | 1 | — |
| Polyethylene glycol (Mw = 20,000) | Water-soluble, Non-ionic Polymeric Binder | — | — | — | — | 1 |
| Yellow Pigment | Styrene-acrylic Dispersed Pigment | 6 | 6 | 6 | 6 | 6 |
| Water | Solvent | Bal | Bal | Bal | Bal | Bal |

Tergitol ® is available from Sigma Aldrich; and Acticide ® is available from Thor Group Limited.

Example 3—Saturation on Two Different Types of Plain Paper

The fifteen ink compositions shown in Tables 2-4 were used not only to generate cyan, magenta, and yellow printed images for testing, but also to generate red, green, and blue printed samples. Red, green, and blue samples can be prepared by admixing 2 of the inks of Tables 2-4 together at appropriate proportions to generate a red, green, or blue image sample. To retain the basic character of each printed sample, C1, M1, and Y1 were printed at various mixture ratios to generate red, green, and blue samples that were devoid of non-ionic polymeric binder. C2, M2, and Y2 were printed at various ratio concentrations to generate red, green, and blue samples that included ionic polymeric binder particles (Urethane-acrylate; particle size about 1.05 nm).

C3-C5, M3-M5, and Y3-Y5 were also printed at various respective ratio concentrations to generate red, green, and blue samples that included non-ionic polymeric binder (Mw=400; Mw=7,500; and Mw=20,000). To illustrate, a red printed image can be formed by combining a magenta pigment and a yellow pigment to arrive at a hue angle of 25; a green printed image can be formed by combining a yellow pigment and a cyan pigment to arrive at a hue angle of 150; and a blue printed image can be formed by combining cyan pigment and magenta pigment to arrive at a hue angle of 265. Thus, six colors were tested, namely cyan, magenta, yellow, red, green, and blue, for each of the five different types of inks, namely salt, salt+ionic binder particles, and salt+non-ionic binder (at 400 Mw, 7,500 Mw, and 20,000 Mw).

Figure 4:
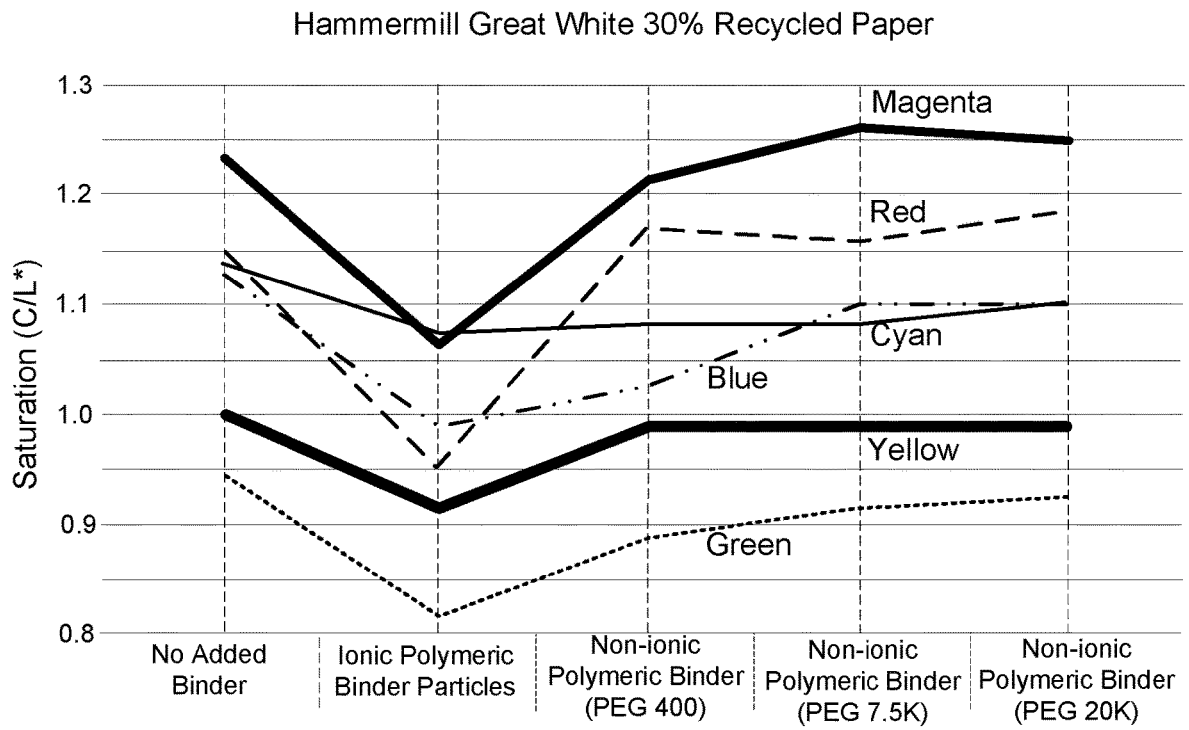
FIG. 4 provides an example graph comparing saturation on a first type of plain paper using inks with ionic polymer dispersed pigment and monovalent salt, with and without various types of polymeric binder in accordance with the present disclosure.
Figure 5:
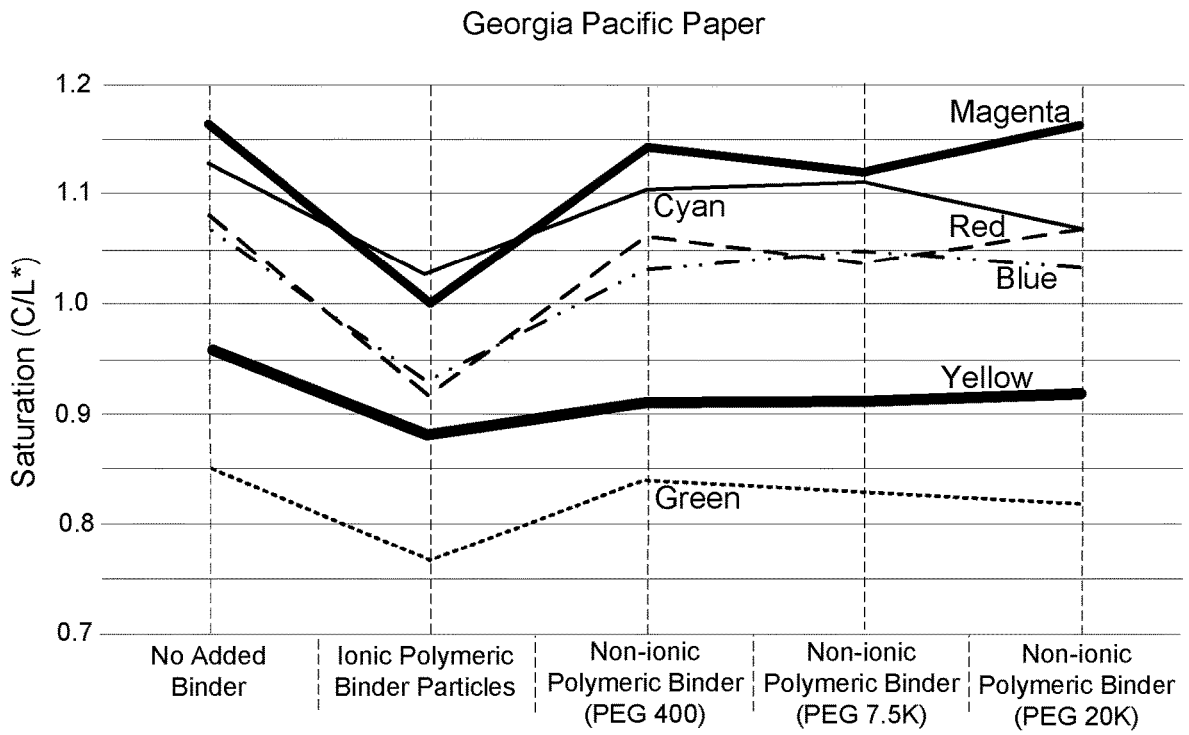
FIG. 5 provides an example graph comparing saturation on a second type of plain paper using inks with ionic polymer dispersed pigment and monovalent salt, with and without various types of polymeric binder in accordance with the present disclosure.

Regardless of the color tested, as can be seen from the data presented in FIGS. 4 and 5, excellent color saturation was achieved by combining the polymer dispersed pigment and a small amount of potassium chloride in an ink composition. See saturation data in FIGS. 4 and 5 labeled "No Added Binder." These samples were printed utilizing inks labeled C1, M1, and Y1 from Tables 2-4. However, the color saturation was significantly reduced when the ionic polymeric binder particles were added in an attempt to improve durability. See saturation data in FIGS. 4 and 5 labeled "Ionic Polymeric Binder Particles." These samples were printed utilizing inks labeled C2, M2, and Y2 from Tables 2-4. When non-ionic polymeric binder was added to improve durability, the color saturation was only minimally diminished in some cases, and even slightly improved in others. This trend was fairly consistent throughout the entire polymer molecular weight range tested, e.g., from 400 Mw to 7,500 Mw to 20,000 Mw. See saturation data in FIGS. 4 and 5 labeled "Non-ionic Polymeric Binder." These samples were printed utilizing inks labeled C3, C4, C5, M3, M4, M5, and Y3, Y4, and Y5 from Tables 2-4. Furthermore, this trend was consistent whether printing primary colors (Cyan, Magenta, and Yellow) or secondary colors (Red, Green, and Blue). Notably, though black inks were not tested, it is expected that the optical density of a black ink would also be retained more closely to the "salt only" examples when adding non-ionic polymeric polymer binder as opposed to adding more traditional ionic polymeric binder particles.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An ink composition, comprising:
   an aqueous liquid vehicle;
   from 1 wt % to 9 wt % pigment dispersed in the aqueous liquid vehicle by an ionic polymeric dispersant associated with pigment;
   from 0.5 wt % to 5 wt % non-ionic polymeric binder having a weight average molecular weight from 400 Mw to 20,000 Mw; and
   from 0.1 wt % to 1.5 wt % monovalent salt.

2. The ink composition of claim 1, wherein the non-ionic polymeric binder is water soluble or miscible with water.

3. The ink composition of claim 1, wherein the non-ionic polymeric binder has a weight average molecular weight from 1,000 Mw to 12,000 Mw.

4. The ink composition of claim 1, wherein the non-ionic polymeric binder has a weight average molecular weight from 4,000 Mw to 10,000 Mw.

5. The ink composition of claim 1, wherein the non-ionic polymeric binder is a polysorbate, a poloxamer, a polyglycol, a polyalcohol, an ethoxylated polyalcohol, a polyamine, a polyamide, a polyimine, a polyacrylamide, a polyvinylpyrrolidone, a polysaccharide, or a mixture thereof.

6. The ink composition of claim 1, wherein the non-ionic polymeric binder is a polyethylene glycol.

7. The ink composition of claim 1, wherein the pigment to monovalent salt weight ratio in the ink composition is from 5:1 to 25:1.

8. The ink composition of claim 1, wherein the pigment is present at from 2 wt % to 8 wt %, the non-ionic polymeric binder is present at from 0.5 wt % to 3 wt %, and the monovalent salt concentration is from 0.1 wt % to 0.8 wt %.

9. The ink composition of claim 1, wherein the pigment has a crash point at from 0.06 M to 0.3 M of the monovalent salt in the ink composition, wherein the monovalent salt is present at from 30% to 95% molar concentration of the crash point.

10. A method of printing, comprising inkjetting an ink composition from a fluid container through an inkjet printing orifice onto a surface of a porous media substrate, wherein the ink composition comprises an aqueous liquid vehicle, from 1 wt % to 9 wt % pigment dispersed in the aqueous liquid vehicle by an ionic polymeric dispersant associated with pigment, from 0.5 wt % to 5 wt % non-ionic polymeric binder having a weight average molecular weight from 400 Mw to 20,000 Mw, and from 0.1 wt % to 1.5 wt % monovalent salt.

11. The method of claim 10, wherein the porous media substrate is an uncoated cellulose-based fibrous paper having a calcium chloride content of less than 2,500 µg/g of paper.

12. The method of claim 10, further comprising crashing and binding the pigment at the surface of the porous media substrate, wherein the pigment is stable while in the fluid container, and when the ink composition is printed on the porous media substrate, the aqueous liquid vehicle is absorbed in the porous media substrate thus increasing an ionic strength of the monovalent salt around the pigment causing the pigment to crash at the surface of the porous media substrate without contact with a separate crashing agent.

13. The method of claim 10, wherein non-ionic polymeric binder has a weight average molecular weight from 1,000 Mw to 12,000 Mw.

14. The method of claim 10, wherein the non-ionic polymeric binder is a polysorbate, a poloxamer, a polyglycol, a polyalcohol, an ethoxylated polyalcohol, a polyamine, a polyamide, a polyimine, a polyacrylamide, a polyvinylpyrrolidone, a polysaccharide, or a mixture thereof.

15. The method of claim 10, wherein the non-ionic polymeric binder has a weight average molecular weight from 400 Mw to 20,000 Mw, and wherein the pigment to monovalent salt weight ratio in the ink composition is from 5:1 to 25:1.

16. The ink composition of claim 1, wherein the ionic polymeric dispersant includes acid groups.

17. The ink composition of claim 1, wherein the ionic polymeric dispersant includes both a hydrophilic moiety and a hydrophobic moiety.

18. The ink composition of claim 1, wherein the monovalent salt includes a quaternary ammonium salt, LiF, NaF, KF, RbF, CsF, LiCl, KCl, NaCl, CsCl, RbCl, LiBr, CsBr, RbBr, KBr, NaBr, $NH_4Br$, LiI, NaI, KI, RbI, CsI, $NaNO_3$, $KNO_3$, $LiNO_3$, $RbNO_3$, $CsNO_3$, $KNO_3$, $Li_2SO_4$, $Na_2SO_4$, $K_2SO_4$, $Cs_2SO_4$, $Rb_2SO_4$, $Li_3PO_4$, $Na_3PO_4$, $KPO_4$, $Rb_3PO_4$, $Cs_3PO_4$, $Li_3PO_4$, monosodium citrate, disodium citrate, trisodium citrate, potassium citrate, rubidium citrate, cesium citrate, lithium citrate, sodium ascorbate, potassium ascorbate, lithium ascorbate, lithium acetate, sodium acetate, potassium acetate, cesium acetate, rubidium acetate, monosodium glutamate, potassium glutamate, or a combination thereof.

\* \* \* \* \*